United States Patent [19]
Kolskog et al.

[11] Patent Number: 4,748,769  
[45] Date of Patent: Jun. 7, 1988

[54] SPRAYER ASSEMBLY FOR LIQUIDS

[76] Inventors: Morley M. Kolskog; Patricia J. Kolskog, both of 831 North Hill Dr., Swift Current, Saskatchewan, Canada, S9H 1X5

[21] Appl. No.: 785,244

[22] Filed: Oct. 7, 1985

[51] Int. Cl.⁴ ............................................. A01G 13/00
[52] U.S. Cl. ............................................ 47/1.5; 47/1.7
[58] Field of Search .................... 47/1.7, 1.5; 239/146, 239/150, 172, 288, 288.3, 288.5

[56] References Cited

U.S. PATENT DOCUMENTS

| | | | |
|---|---|---|---|
| 2,293,517 | 8/1942 | Messinger | 47/1.7 |
| 2,935,818 | 5/1960 | Crane | 47/1.5 |
| 2,977,715 | 4/1961 | Lindsay | 47/1.7 |
| 3,728,817 | 4/1973 | Huey et al. | 47/1.5 |
| 4,223,478 | 9/1980 | McHugh | 47/1.5 |
| 4,443,970 | 4/1984 | Randolph | 47/1.5 |

FOREIGN PATENT DOCUMENTS 0058611 8/1982 European Pat. Off. ............... 47/1.5

Primary Examiner—Robert A. Hafer  
Assistant Examiner—Bradley M. Lewis  
Attorney, Agent, or Firm—Stanley G. Ade; Murray E. Thrift; Adrian D. Battison

[57] ABSTRACT

A relatively small sprayer for liquid fertilizers, weed killers, herbicides or the like is mounted on a small frame and is attachable to a three-point hitch of a tractor or may be pulled by hand. A tank is mounted on the frame and a ground engaging roller is journalled transversely across the rear of the frame. An open based enclosure encloses the roller and shields the spray nozzle boom which extends transversely adjacent the front of the enclosure. The nozzles spray the liquid downwardly and rearwardly so that it strikes the plants on the front and top side thereof. It also maintains the roller in a wet condition so that the roller engages the rear of the plants as it passes over same thus ensuring a complete treatment of the vegetation. Flexible skirts extend downwardly from the front and side edges of the enclosure to prevent any spray escaping from around the perimeter of the enclosure.

14 Claims, 2 Drawing Sheets

SPRAYER ASSEMBLY FOR LIQUIDS

This invention relates to new and useful improvements in spray assemblies, particularly relatively small spray assemblies adapted to be pulled behind a tractor or pulled manually and used for example in gardens and relatively small areas.

BACKGROUND OF THE INVENTION

Many spray assemblies exist which utilize a roller and examples include U.S. Pat. Nos. 2,935,818, 3,257,753, 4,019,278, 4,208,835, 4,223,478, 4,253,272 and 4,346,531.

However, all of these utilize rollers upon which the liquid being applied, is sprayed and then transferred to the plants by rolling the roller over the plants. This means that only the rear sides of the plants are contacted by the liquid, be it fertilizer, herbicide, weed killer or the like and plants which may be situated in crevices or depressions in the ground, may not be contacted at all because the length of the roller causes same to span the crevices and/or depressions.

In spray assemblies which use a direct spray, only the tops and fronts of the plants may be treated and such devices are difficult to use on reatively windy days because of the undesirable dispersion of the spray chemicals which may affect adjacent vegetation such as shrubs, trees or the like.

SUMMARY OF THE INVENTION

The present invention overcomes both of these disadvantages firstly by ensuring that both the fronts, tops and rear sides of the plants are contacted by the liquid and secondly by preventing any of the spray from being dispersed either by bouncing from the ground or by windy conditions.

In accordance with the invention there is provided a spray assembly for plants, grass and the like comprising in combination an open based enclosure, a liquid supply tank mounted on said enclosure, a ground engaging roller journalled for rotation transversely within said enclosure and adjacent the rear side thereof, a spray assembly mounted within the front of said enclosure, said spray assembly being situated whereby spray is directed rearwardly and downwardly therefrom within said enclosure, said spray assembly being operatively connected to said liquid supply tank whereby liquid within said tank is conveyed to said spray assembly under pressure, and flexible curtains extending downwardly from the lower edges of the sides of said enclosure, at least on the sides and front thereof.

It should be noted that the essential portion of the invention is that the sprayer and roller assemblies are enclosed within an enclosure and secondly the spray is directed rearwardly adjacent the area of contact with the front of the roller with the plants and that sufficient spray is provided to thoroughly wet the roller surface and maintain same in this condition so that the spray firstly strikes the front and top of the plants and the wet roller passing thereover contacts the rear sides of the plants.

Although the device is designed primarily for use on weeds and grass areas, nevertheless it can of course be used on plants in which the pressure of the roller does not cause damage thereto.

A further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates to this specification proceeds, the invention is herein described by reference to the accompanying drawings forming a part hereof, which includes a description of the best mode known to the applicant and of the preferred typical embodiment of the principles of the present invention, in which:

DETAILED DESCRIPTION

Figure 1:
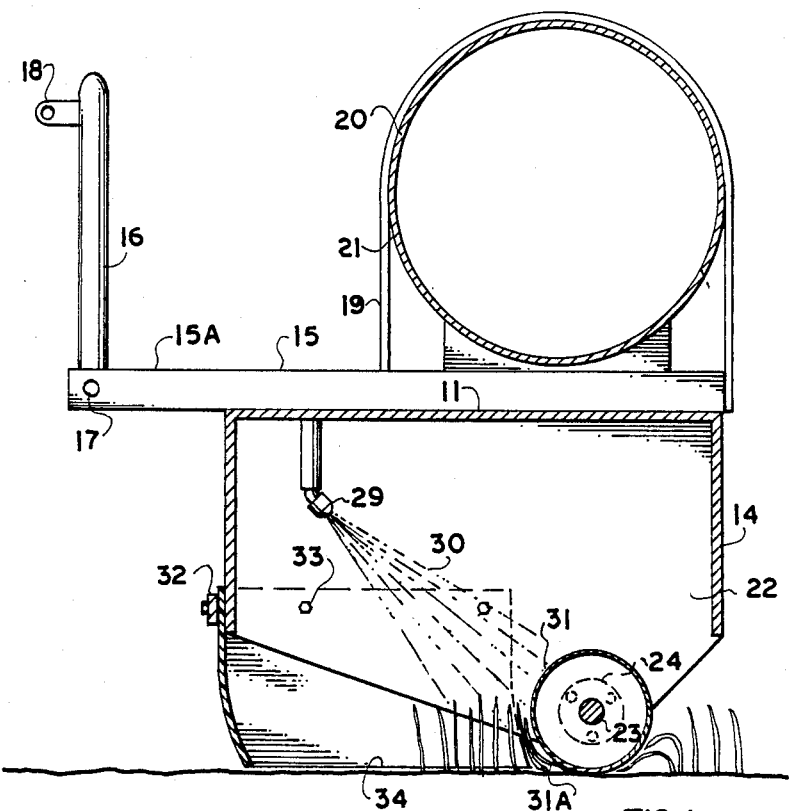
FIG. 1 is a partially schematic side elevation of the device.
Figure 2:
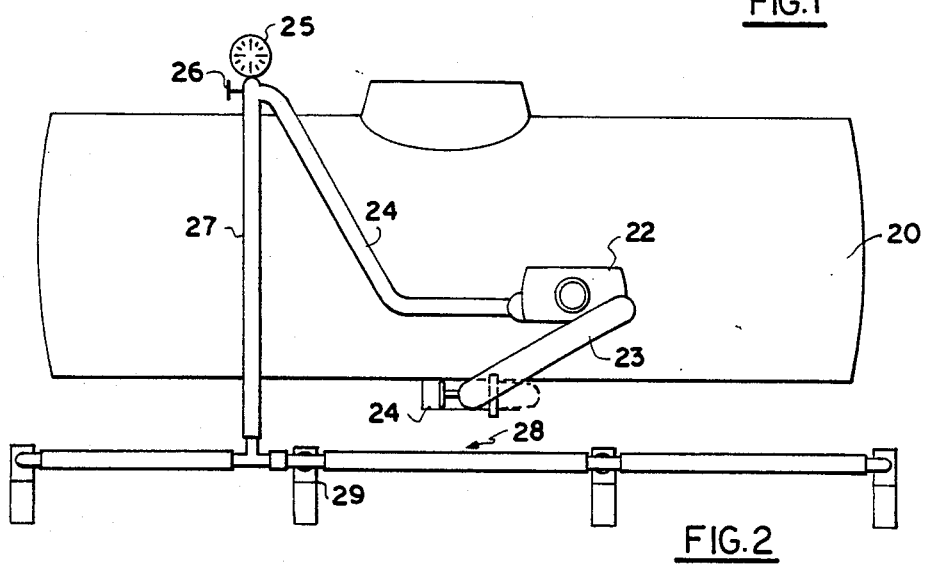
FIG. 2 is a partially schematic front elevation thereof.
Figure 3:
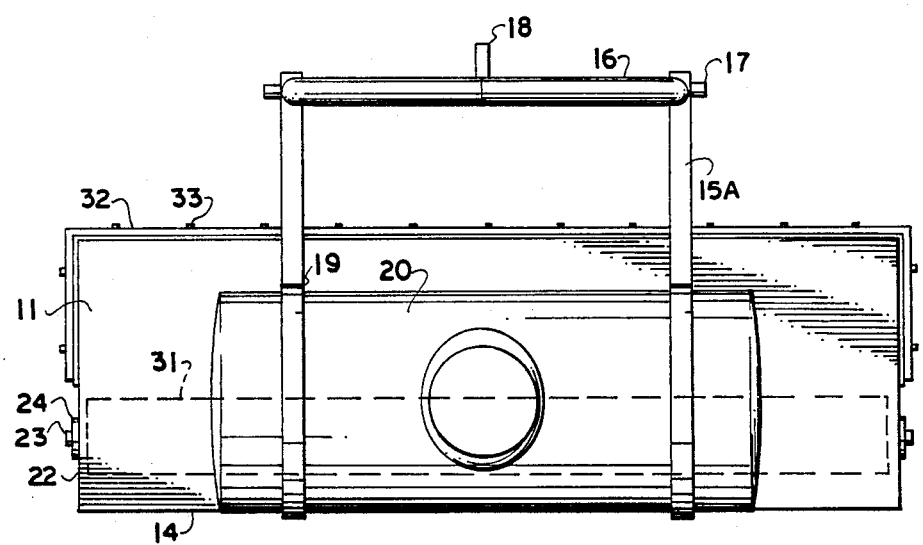
FIG. 3 is a partially schematic top plan view thereof.

In the drawings like characters of reference indicate corresponding parts in the different figures.

Proceeding therefore to describe the invention in detail, the device consists of an open based enclosure generally designated 10 which is preferably formed from metal or substantially rigid plastic. It is preferably rectangular when viewed in plan and consists of an upper side 11, a pair of side walls 12, a front wall 13, and a rear wall 14.

Preferably there are provided a pair of spaced and parallel frame members 15 secured to the upper side 11 of the enclosure and supporting same and extending forwardly as at 15A to terminate in a vertical rectangular frame 16 by which the device may be secured to the three-point hitch of a tractor or the like (not illustrated). This hitch 16 includes the pair of spaced apart lower pins 17 and the centrally located upper abutment 18 both of which are conventional.

A cradle 19 is secured to the frame 15 on the upper side thereof, said cradle supporting a substantially oblong cylindrical tank 20 having a filler assembly 21 on the upper side thereof and adapted to receive the liquid chemical and water or other treatment liquid as may be desired.

A pair of straps 21 extend from the cradle and around the tank 20 to clamp same into position upon the frame members 15.

A pump 22 is provided adapted to be driven by the source of power in a conventional manner (not illustrated). It includes an inlet conduit 23 extending from the well 24 within the base of the tank 20 and an outlet conduit 24 which extends to a pressure gauge 25 and control valve 26 and then via conduits 27, to a spray boom assembly collectively designated 28.

This spray boom assembly extends transversely across the front of the enclosure and is provided with a plurality of spaced apart spray nozzles 29 extending from the boom 28 and into the enclosure via apertures formed within the top or upper side 11 thereof.

These nozzle assemblies are conventional in construction and are preferably what are known as "flood" type nozzles and reference to FIG. 1 will show that these nozzles are directed downwardly and rearwardly from adjacent the front of the enclosure towards the rear thereof as shown in phantom by reference character 30, the purpose of which will hereinafter be described.

Associated with the pumping system are conventional relief valves, strainers, flexible conduits, hose clamps and the like but such details are well known so that it is not believed necessary to describe same.

Situated within the rear of the enclosure is a steel or other material roller 41 journalled for rotation between the sides 12 of the enclosure, the lower edges 22 which extend downwardly below the enclosure. The roller is preferably secured to stud shafts 23 running in bearing assemblies 24 secured to the sides 22.

When in the operating position, this roller engages the ground as clearly shown in FIG. 1 and the direction of the spray 30 from the nozzles 29 is such that it will strike the front sides and top of the vegetation over which the device is being used and also maintain the surface 31A of the roller 31, in a wet condition so that it in turn, transfers the liquid to the rear sides of the vegetation as the roller passes over same thus ensuring complete coverage of the vegetation be it grass, weeds, plants or the like.

The direction of the nozzles also ensures that the spray 30 strikes all plants, even those in crevices or depressions in the ground so that if ground is uneven, a greater percentage of contact is obtained either by the roller or the direct spray or a combination of both.

Flexible skirts extend around the sides and front of the enclosure and extend downwardly therefrom, the side skirts extending from the front to adjacent the roller assembly 31. These are clamped in position by means of a U-shaped bracket or skirt retainer 32 bolted or rivoted as at 33, to adjacent the lower edge of the sides and front of the enclosure and the lower edges 34 of these flexible skirts engage within the vegetation thus providing an almost complete seal and preventing any spray from nozzles 29, from escaping from the enclosure thus eliminating any possibility of damage due to spray being carried by the wind or bouncing or otherwise engaging other vegetation such as shrubs, trees, flowers or the like.

The device is designed primarily for use on relatively small areas and not large scale agricultural fields. The size, which is variable within limits, allows easy use in parts, golf courses, cemeteries and the like as well as road allowances, and gardens.

A relatively small model approximately 2 feet wide may be used for residential lawns under which circumstances, the tank may be pressurized manually by means of a conventional pump and a handle provided instead of hitch 15. Alternatively, a 12 volt battery and air compressor may be utilized together with a detachable handle to facilitate compact storage.

Although the device is designed primarily for use on grass, weeds and the like, it can of course be adapted for use on other vegetation provided such vegetation is not damaged by the roller passing thereover.

When connected by means of a three-point hitch to the tractor, the complete assembly is easily lifted clear of the ground for transportation purposes.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A spray assembly for plants, grass and the like comprising in combination a framework, an open based enclosure supported by said framework, a liquid supply tank and pressure means mounted on said framework, a ground engaging roller journalled for rotation transversely within said enclosure and adjacent the rear side thereof, a spray assembly mounted within the upper front portion of said enclosure spaced from said roller, said spray assembly being located forward and above said roller including nozzle means directed downwardly and rearwardly whereby spray is directed rearwardly and downwardly therefrom into said enclosure, onto the front and sides of the vegetation in advance of said roller, and onto said roller and is transferred by said roller onto the rear side of vegetation over which the assembly passes, said spray assembly being in fluid communication with said liquid supply tank whereby liquid within said tank is conveyed to said spray assembly under pressure, and flexible curtains extending downwardly from the lower edges of the sides of said enclosure, at least on the sides and front thereof.

2. The assembly according to claim 1 in which said enclosure is substantially rectangular when viewed in plan.

3. The assembly according to claim 2 which includes a framework supporting said enclosure on the underside thereof and said tank on the upper side thereof.

4. The assembly according to claim 3 in which said spray assembly includes a spray boom extending transversely of said enclosure and a plurality of spaced apart nozzle assemblies operatively extending from said boom and into said enclosure.

5. The assembly according to claim 3 in which said framework extends forwardly of said enclosure, and means on said framework to operatively connect said assembly to the three-point hitch mechanism of a tractor.

6. The assembly according to claim 5 in which said spray assembly includes a spray boom extending transversely of said enclosure and a plurality of spaced apart nozzle assemblies operatively extending from said boom and into said enclosure.

7. The assembly according to claim 1 in which said framework supports said enclosure on the underside thereof and said tank on the upper side thereof.

8. The assembly according to claim 7 in which said framework extends forwardly of said enclosure, and means on said framework to operatively connect said assembly to the three-point hitch mechanism of a tractor.

9. The assembly according to claim 8 which includes means to secure said skirt to adjacent the lower edges of said enclosure, said means including an attaching strip bolted to said enclosure and clamping said flexible skirt therebetween, the lower edges of said skirt extending downwardly to adjacent the ground surface.

10. The assembly according to claim 8 in which said spray assembly includes a spray boom extending transversely of said enclosure and a plurality of spaced apart nozzle assemblies operatively extending from said boom and into said enclosure.

11. The assembly according to claim 8 which includes a cradle for said tank, mounted upon said framework and a hitch on the front end of said framework.

12. The assembly according to claim 7 in which said spray assembly includes a spray boom extending transversely of said enclosure and a plurality of spaced apart nozzle assemblies operatively extending from said boom and into said enclosure.

13. The assembly according to claim 12 which includes means to secure said skirt to adjacent the lower edges of said enclosure, said means including an attaching strip bolted to said enclosure and clamping said flexible skirt therebetween, the lower edges of said skirt extending downwardly to adjacent the ground surface.

14. The assembly according to claim 1 which includes means to secure said skirt to adjacent the lower edges of said enclosure, said means including an attaching strip bolted to said enclosure and clamping said flexible skirt therebetween, the lower edges of said skirt extending downwardly to adjacent the ground surface.

* * * * *